United States Patent [19]

Rozmus, Jr.

[11] Patent Number: 4,724,123
[45] Date of Patent: Feb. 9, 1988

[54] PLASTIC FOAM CONTAINER FOR THE DENSIFICATION OF POWDER MATERIAL

[75] Inventor: Walter J. Rozmus, Jr., Traverse City, Mich.

[73] Assignee: The Dow Chemical Company, Midland, Mich.

[21] Appl. No.: 12,789

[22] Filed: Feb. 9, 1987

[51] Int. Cl.$^4$ .................................................. B22F 1/00
[52] U.S. Cl. ......................................... 419/68; 419/42; 419/49; 264/570; 100/211
[58] Field of Search ............................. 419/42, 49, 68; 264/570

[56] References Cited

U.S. PATENT DOCUMENTS

Re. 32,117  4/1986  Weaver .................................. 419/53
4,381,931  5/1983  Hunold et al. ............................ 419/2

Primary Examiner—Stephen J. Lechert, Jr.
Attorney, Agent, or Firm—Reising, Ethington, Barnard, Perry & Milton

[57] ABSTRACT

A quantity of powder material (14) which is less dense than a predetermined density is disposed in a sealed container (12) which is encapsulated in a pressure transmitting medium (16). The pressure transmitting medium (16) is placed within a pot die (26) of a press where it is restrained as ram (24) enters the pot die (26) and applies a force to the pressure transmitting medium (16) and the container (12). The pressure transmitting medium (16) comprises liquid and is capable of transmitting pressure omnidirectionally about the container (12). The container (12) has a porous structure. The container (12) collapses and permanently deforms as the powder (14) compacts. The container does not completely expand to its initial shape after being removed from the pressure transmitting medium (16) and therefore saves the compacted powder (14') from resilient forces of the container (12) tending to rebound the container (12) to its initial shape.

16 Claims, 3 Drawing Figures

PLASTIC FOAM CONTAINER FOR THE DENSIFICATION OF POWDER MATERIAL

TECHNICAL FIELD

The subject invention is used for consolidating preformed bodies from powder material of metallic and nonmetallic compositions and combinations thereof to form a predetermined densified compact.

BACKGROUND ART

It is well known in the art to place powder in a container to place the container in a pressure transmitting medium, and apply pressure thereto to form a densified compact of less than full density, known as a green part. The prior art includes methods using elastomeric containers. After compaction has been completed, the pressure is removed and the container expands to its initial size and shape. This expansion has a tendency to crack or tear the surface of the newly formed green part. Binders are used to prevent such surface tearing of the green part but are not totally effective.

STATEMENT OF THE INVENTION AND ADVANTAGES

According to the present invention there is provided a method and assembly for compacting powder metals, nonmetals, and combinations thereof to form a densified compact of a predetermined density, which is known as a green part at less than full density. A quantity of such powder material which is less dense than the predetermined density is disposed in a sealed container. The container is then disposed within a pressure transmitting medium. A predetermined densification of the material is caused by applying hydrostatic pressure to the medium, causing omnidirectional pressure transmission to the container. The method is characterized by utilizing a collapsible container having a permanently deformable porous structure, and collapsing the porous structure in response to the hydrostatic pressure of the medium while preventing contact between the medium and the material so that the container structure remains collapsed after the hydrostatic pressure of the medium is discontinued.

Accordingly, the present invention offers a container which is collapsible and will not completely expand to its initial shape upon removal of the pressure, eliminating cracking or tearing of the densified compact surface. Since the container does not significantly expand after being compacted, the need for binders is eliminated. Also, the container may be placed in a pressure transmitting medium capable of fluidic flow and will prevent contact of the medium with the powder material.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 2:
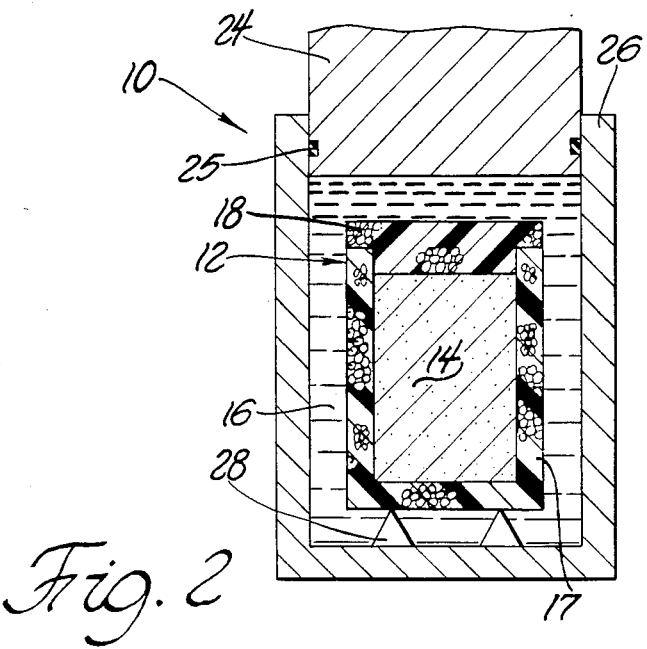
FIG. 2 is a cross-sectional view showing the container of FIG. 1 within the pressure transmitting medium.
Figure 1:
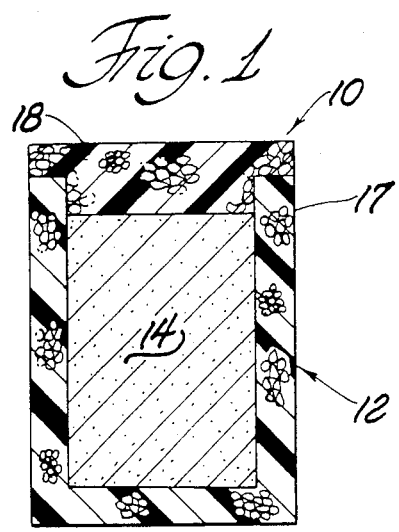
FIG. 1 is a cross-sectional view of a container of the subject invention and containing powder material.
Figure 3:
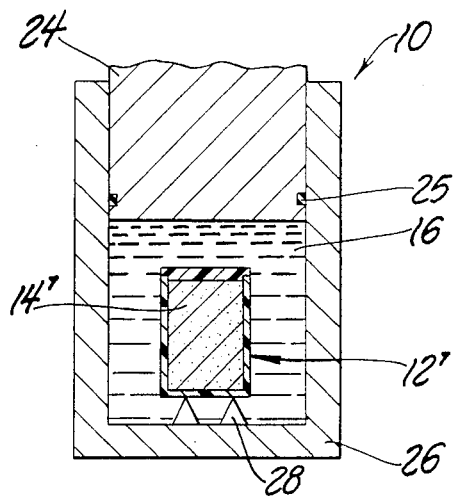
FIG. 3 is a cross-sectional view of reduced scale illustrating the container and pressure transmitting medium after full densification to a predetermined degree.

Referring to the drawing, an assembly for compacting powder metals, nonmetals, and combinations thereof to form a densified compact 14' of a predetermined density is generally shown at 10.

The assembly 10 includes a container generally indicated at 12 in which a quantity of such powder material 14 which is less dense than the predetermined density is disposed. Generally, the powder is particulate and free flowing. The assembly further includes a pressure transmitting medium 16 in which the container 12 is disposed and external pressure is applied to the exterior of the medium 16 by hydrostatic pressure applied to the medium 16 to cause omnidirectional pressure transmission to the container 12. The container 12 is disposed in the medium 16. The assembly further includes pressure application means for encapsulating the medium 16 and applying pressure thereto.

The assembly is characterized by the container 12 having a permanently deformable porous or cellular structure to allow the container 12 to collapse in response to the hydrostatic pressure of the medium 16 while preventing contact between the medium 16 and the powder material 14 so that the container structure remains collapsed after the hydrostatic pressure of the medium 16 is discontinued. The container structure may rebound very slightly but not enough to place injurious forces on the compacted part.

More specifically, the porous structure of the container 12 allows the container 12 to collapse 12' along with the compaction of the powder material 14. The container 12 collapses in response to hydrostatic pressure applied by the medium 16. Also, the collapsed container 12' does not substantially re-expand when the pressure is removed. That is, as the container 12 is collapsing, it builds no internal forces tending to cause the container 12 to expand to its initial size and shape. Because the container 12 builds no internal forces causing it to re-expand, the compacted powder 14' is saved from resilient forces of the container 12' tending to rebound the container 12' to its initial size and shape. Since the container 12 compacts and does not re-expand after the pressure has been removed, it has a final self sustaining density greater than its initial density. Initially, the porous structure of the container 12 includes many air filled or empty gaps. Upon compaction of the container 12, the porous structure collapses and the air filled gaps are reduced in size thus increasing the density of the container. Because the collapsed container 12' does not re-expand it retains its compacted shape and has no internal forces causing it to expand, and will not tear or crack the surface of the compacted powder 14' eliminating the need for binders. The collapsed container 12' is subsequently removed from the compacted powder 14' by placing it in a rapid omnidirectional cycle mold where full densification takes place. In other words, in the preferred mode of the subject invention lose powder is compacted to less than full or the desired density, i.e., to a green part, and thereafter placed in another cycle for full densification.

The container assembly 12 is impermeable i.e. impervious to fluid flow therethrough. The container 12 also has a porous or cellular structure. The porous structure provides for effective pressure transmission between the medium 16 and the material 14 being compacted since there is little resistance to pressure transmission by the walls of the porous container 12. The porous structure may be defined by interconnected closed cells. Since the closed cells are interconnected the pores are non interconnected and, therefore, do not allow fluid to flow therethrough. One type of material which may be used to form a container 12 in accordance with the present invention is a plastic foam, in particular, cellular foam. Cellular material sold under the trademark STYROFOAM has the properties of being porous and yet fluid impervious. Also, this material does not expand after the pressure has been removed.

The container 12 is a multipart container which is adhesively secured together to define an impermeable seal. In one embodiment, the container 12 includes a base 17 and a cover 18. The cover 18 is sealed on the base 17 prior to placing the container 12 in the pressure transmitting medium 16. Since the container 12 is preferably made of plastic foam, it can be cut, formed, or cast in any desired shape. Since the plastic foam is rigid it retains its shape, and many shapes of parts to be compacted are possible.

The pressure transmitting medium 16 comprises liquid which transmits pressure omnidirectionally to the container 12. A pressure transmitting liquid which may be used in accordance with the present invention is water. Alternatively, liquid glass or a composite glass material as disclosed in U.S. Pat. No. 4,428,906 may be used.

The pressure application means comprises a ram 24 and a pot die 26 of a press. The ram 24 is disposed in the pot die 26. The ram 24 contains a seal 25 disposed on the periphery thereof for preventing the pressure transmitting medium 16 from flowing out of the pot die 26 between the ram 24 and the pot die 26. The lower pot die 26 receives the container 12. The container 12 is suspended in the pot die 26 by a plurality of legs 28 to hold the container 12 in place. The ram 24 applies pressure to the pressure transmitting medium 16. Since the medium 16 and container 12 are restrained in the die 26, pressure is uniformly transferred to the container 12. The pressure transmission takes place omnidirectionally, i.e. pressure is transferred equally to the container 12 at all points in a direction perpendicular to the surface of the container 12 at each point.

The instant invention therefore provides a method for compacting powder metals, nonmetals, and combinations thereof to form a densified compact 14' of a predetermined density. A quantity of such powder material 14 which is less dense than the predetermined density is disposed in a sealed container 12. The container 12 is then disposed in a pressure transmitting medium 16. A predetermined densification of the material is caused by applying hydrostatic pressure to the medium 16 to cause omnidirectional pressure transmission to the container 12.

The method is characterized by utilizing a collapsible container 12 having a permanently deformable porous structure. The container 12 is a multipart container adhesively secured together. The method is further characterized by collapsing the porous structure in response to the hydrostatic pressure of the medium 16 while preventing contact between the medium 16 and material 14 so that the container structure remains collapsed after the hydrostatic pressure of the medium 16 is discontinued.

More specifically, the container 12 used in the process is porous and permanently deformable. That is the container 12 has a porous structure which may be defined by interconnected closed or open cells. Because the container 12 is porous, the pressure is transmitted to the powder 14 with minimal loss through the container walls. Also, because the porous structure is connected, fluid cannot flow through the container 12, preventing contact between the medium 16 and the powder material 14.

In operation, powder metal, non metal, or a combination thereof 14 is poured into a container 12 having a permanently deformable porous structure and vibrated to even density. The container 12 is then sealed to prevent contact of the material 14 and the medium 16. The pressure transmitting medium 16 is disposed in a pot die 26. The container 12 is suspended in the pressure transmitting medium 16 on a plurality of legs 28. A ram 24 is then inserted in a pot die 26 in close connection with the walls of the pot die 26. Pressure is then applied to the medium 16 by the ram 24. Since the container 12 and medium 16 are restrained by the pot die 26, hydrostatic pressure is transmitted to the container 12 and the powder 14. The container 12 and the powder 14 compact so that the final and self sustaining density of the powder compact 14' and container 12' are greater than their respective initial densities. The pressure transmitting medium 16 is then removed from the collapsed container 12'. The collapsed container 12' does not expand to the initial size because during compaction, the container 12 builds no internal forces causing it to re-expand. Thus the surface of the compact 14' is not torn or cracked by re-expansion of the collapsed container 12'. Finally, the collapsed container 12' and compact 14' are transferred to a rapid omnidirectional cycle die, where full densification of the compact 14' takes place. The collapsed container structure may be removed from the compacted part by a solvent, sand blasting, or the like.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method for compacting powder metals, nonmetals, and combinations thereof (14) to form a densified compact (14') of a predetermined density wherein a quantity of such material (14) which is less dense than the predetermined density is disposed within a sealed container (12), characterized by disposing the container (12) in direct contact and within a pressure transmitting medium (16) and causing a predetermined densification of the material (14) by applying hydrostatic pressure applied to the medium (16) causing omni-directional pressure transmission to the container (12), utilizing a collapsible container (12) having a permanently deformable porous structure defined by impermeable interconnected closed cells, and collapsing the porous structure in response to the hydrostatic pressure of the medium (16) while preventing contact between the medium (16) and the material (14) so that the container structure remains collapsed after the hydrostatic pressure of the medium (16) is discontinued.

2. A method as set forth in claim 1 further characterized by collapsing the porous structure to a final and self sustaining density greater than its initial density.

3. A method as set forth in claim 2 further characterized by a porous structure comprising cellular foam.

4. A method as set forth in claim 2 further characterized by using a multipart container (12) adhesively secured together to define an impermeable seal.

5. A method as set forth in claim 4 further characterized by using a pressure transmitting medium (16) comprising fluid.

6. A method as set forth in claim 5 further characterized by placing the container (12) into a pot die (26) containing the pressure transmitting medium (16) and inserting a ram (24) into the pot die (26) to compress the medium (16) to apply a predetermined force to the container (12) and material (14) while restrained in the pot die (26).

7. A method as set forth in claim 6 further characterized by suspending the container (12) in the pressure transmitting medium (16) on a plurality of legs (28).

8. A method as set forth in claim 10 further characterized by applying pressure to the ram (24) to densify the material (14).

9. An assembly for compacting powder metals, non-metals, and combinations thereof to form a densified compact (14') of a predetermined density comprising; a container (12) in which a quantity of such material (14) which is less dense than the predetermined density is disposed, and a pressure transmitting medium (16) in which external pressure is applied to the exterior of said medium (16) by hydrostatic pressure applied by said medium (16) and to cause omni-directional pressure transmission to said container, said assembly characterized by said container (12) disposed in direct contact and within said medium (16), and pressure application means for encapsulating said medium (16) and applying pressure thereto, said container (12) having a porous structure defined by impermeable interconnected closed cells which is collapsible and permanently deformable in response to the hydrostatic pressure of said medium (16) for preventing contact between said medium (16) and said material (14) during such collapse.

10. An assembly as set forth in claim 12 further characterized by said container (12) having a final and self-sustaining density greater than its initial density.

11. An assembly as set forth in claim 10 further characterized by said porous structure comprising cellular foam.

12. An assembly as set forth in claim 10 further characterized by said container (12) being a multipart container adhesively secured together to define an impermeable seal.

13. An assembly as set forth in claim 12 further characterized by said container (12) including a cover (18) and a base (17), said cover (18) being sealed on said base (17).

14. An assembly as set forth in claim 13 further characterized by said pressure application means comprising a pot die (26) and a ram (24) disposed in said pot die (26).

15. An assembly as set forth in claim 14 further characterized by said pressure transmitting medium comprising fluid (20).

16. An assembly as set forth in claim 15 further characterized by said ram (24) containing a seal (25) disposed on the periphery thereof for preventing said pressure transmitting medium (16) from flowing between said ram (24) and said pot die (26).

* * * * *

UNITED STATES PATENT AND TRADEMARK OFFICE
CERTIFICATE OF CORRECTION

PATENT NO. : 4,724,123

DATED : February 9, 1988

INVENTOR(S) : Walter J. Rozmus, Jr.

It is certified that error appears in the above-identified patent and that said Letters Patent is hereby corrected as shown below:

Column 5, line 24 please delete "10" and insert -- 7 --.

Column 6, line 10 please delete "12" and insert -- 9 --.

Signed and Sealed this

Twenty-second Day of November, 1988

Attest:

DONALD J. QUIGG

*Attesting Officer*     *Commissioner of Patents and Trademarks*